United States Patent Office 3,149,964
Patented Sept. 22, 1964

3,149,964
REMOVAL OF ZINC FROM LEAD-CONTAINING FLUE DUST
Werner Schwartz, Frankfurt am Main, Germany, assignor to Metallgesellschaft A.G., Frankfurt am Main, Germany
No Drawing. Filed Nov. 27, 1961, Ser. No. 155,175
Claims priority, application Germany, Dec. 10, 1960, M 47,363
3 Claims. (Cl. 75—120)

The invention relates to the removal of zinc from lead containing flue dust and particularly to such removal in a self-maintaining lead smelting process.

Modern flotation processes produce lead ore concentrates which contain hardly any gangue and in which the ore is enriched up to a lead content of 65% to 80%. For example, a concentrate is worked up with 80% lead, 14% sulfur and 6% gangue. The smelting of this concentrate according to the conventional shaft furnace procedure requires a preliminary sinter roasting with the addition of suitable shaft oven fluxes. The agglomerate is then reduced in a shaft furnace in the presence of coke to raw lead, and a lead-poor slag is formed. But the reduction in the shaft furnace proceeds undisturbed only if the charge contains at most about 45% lead, because at higher lead concentrations the charge agglomerates and becomes impervious before the reaction is completed. It is therefore customary to dilute the lead content of the concentrate from the flotation process to 40% or 45%, either before or after roasting but before the delivery to the shaft furnace, by recycled slags, lime or silica, primarily material which is separated in the flotation or in the shaft furnace. By this, however, aside from some saving in cost of transportation, the advantages of the high purity achieved by flotation are lost, because the throughput through the shaft furnace is correspondingly reduced and the heat required per ton of lead recovered is increased correspondingly to the dilution of the material charged in.

There are also procedures known for the processing of concentrates without dilution by means of additives, such as the roasting reaction of Newman hearths or Schlippenbach installations.

There are also known procedures for recovering metallic lead from ores, intermediates or waste products, which contain lead sulfide, according to the roast reaction process. In a special form of this process, with self-maintaining lead smelting, the material to be treated with the addition of recycled material and/or flue dust, without substantial addition of other materials, is sintered and thus subjected to an oxidizing or sulfatizing roasting, which brings into the raw material an amount of chemically bound oxygen at least sufficient for the roast reaction process. The roasted sinter is, if necessary with the addition of sulfidic materials, and without the addition of further reactive materials, heated to the reaction temperature, so that the charge reacts to produce volatile compounds of sulfur, fluid metallic lead and fluid slag. The end products are lead bullion, slag with a low lead content and flue dust. The generally lead-rich flue dust is returned to the sinter mixture, because its oxide and sulfur content supports the oxidation or sulfatizing effect, obtained by sintering, of a part of the lead content. If the sinter mixture contains zinc, this can be removed only with the waste slag, because the lead bullion has practically no solubility for zinc and the flue dust passing off is returned to the process. But a special characteristic of the self-maintaining lead smelting is that the quantity of slag is not substantially greater than the quantity which corresponds to the gangue charged in, and is therefore small compared with the quantity of lead bullion, generally amounting to about 10% of the lead content of the charge.

It has been found that the slag removed from this process can contain at most about 20% zinc, and consequently the zinc content of the ore concentrate must not exceed 2%. If this proportion is exceeded, an enrichment of the zinc content of the flue dust with a consequent increase in the quantity of dust follows. The recycling of the flue dust to the charge results in a continuous enrichment of the zinc content which can lead to disturbances.

The average zinc content of lead concentrates is 3% to 7%. A processing of these concentrates according to the process just described while maintaining a proper metal balance is not possible. The enrichment of the zinc content in the processing can only be prevented by increasing the quantity of slag, taking off a part of the flue dust or removing zinc from the flue dust. An increase of the slag destroys the advantages of the self-maintaining lead smelting, whereas removal of a part of the flue dust results in a loss of metal. There are ways of recovering the lead and zinc content of the flue dust, which however are expensive and commercially impractical in view of the very small metal content of the flue dust.

The object of the present invention is to provide a procedure which avoids many of the disadvantages of the prior process.

Another object of the invention is to provide an economical procedure for the removal of zinc alone from flue dust in a self-maintaining lead smelting process, so that it is possible to process lead ores with higher zinc content in such a process without the difficulties heretofore discussed.

According to the process, the necessary separation of flue dust from the flue gases is accompanied by a simultaneous separation of the zinc content, so that, in addition to a smaller quantity of dust, a lead-free zinc product results, without great expense. According to the invention, the dust-containing flue gases are not conducted, in the usual way, to filter devices or electric gas cleaners and there freed of dust, but instead are led to a liquid washer, such as a Venturi washer, a scrubber or the like. In this liquid washer the gases are treated with a solvent medium which selectively reacts to form and dissolves out zinc compounds from lead compounds, such as acids, as dilute sulfuric or sulfurous acids, hereinafter called "zinc-selective solvents."

The solution can enter the liquid washer through nozzles and can flow counter-currently or co-currently with the flue gas. The flue gas dust moistened by the liquid is further worked up in the usual way. It can be allowed to stand in a thickener where it settles out. The clarified fluid contains the dissolved-out zinc in dissolved form and can be recycled in the liquid washer for further enrichment of the zinc content. The dust, freed of its zinc content, that is, the thickener mud, is in the form in which it leaves the thickener or after drying is returned, as by mud pumps, to the mixing arrangement of the sintering apparatus or directly to the smelting apparatus. In undried form it can, if added to the mixture for sinter roasting, furnish the moisture needed for the mixing. The zinc content of the solvent is recovered by conventional means, such as precipitation, crystallization or electrolysis. This can advantageously be carried out on a branched off part of the recirculating solvent when a sufficient concentration is reached.

The spent solvent is recovered. If sulfuric acid is used as a solvent, the spent $SO_4$ ions can be restored by the addition of sulfuric acid, however the $SO_2$ or $SO_3$ content of the flue gas can be sufficient to make up this loss.

A special modification of the invention consists in the addition of oxidizing media and/or catalysts to the solvent to produce an accelerated conversion of $SO_2$ to $SO_3$, or of sulfurous to sulfuric acid. As oxidizing agents, I may use metal compounds in higher oxidation states such as $Fe_2O_3$, $Fe_3O_4$, $Fe_2(SO_4)_3$ or $KMnO_4$, chlorine in elemental form or as a compound such as $CaOCl_2$ or $NaClO_3$. As catalysts, I may use iron or iron compounds such as $Fe_2(SO_4)_3$.

If the physical characteristics of the dust require it, a wetting agent may be added such as sulfates or sulfonates or alkanes, alcohols, hydroaromatic sulfates or sulfonates or the like.

The advantages of the procedure of the invention are shown by the following examples.

I. Conventional procedure: Smelting a sulfidic lead concentrate (galena) with 73.5% lead and 4.3% zinc.

(1) Agglomeration of 1000 tons of concentrate in the updraught sinter machine gives:
 (a) 870 tons of roast sinter with 82% lead (principally metallic) and 4.8% zinc.
 (b) 30 tons of flue dust with 73% lead, 3.4% zinc, which is fed back to the sinter machine.

(2) Smelting of 870 tons of sinter in a short drum type rotary furnace gives
 (a) 680 tons of lead bullion.
 (b) 100 tons of slag with a low lead content containing 16 tons of zinc.
 (c) 80 tons of flue dust with 33.6 tons of lead, 29.6 tons of zinc.

II. If the resulting flue dust is processed with a further 1000 tons of concentrate, the following results:

(1) Agglomeration of 1110 tons of concentrate and flue dust in the sinter machine gives:
 (a) 975 tons of roast sinter with 79% lead, 7.0% zinc.
 (b) 35 tons of flue dust with 71% lead and 4.2% zinc.

(2) Smelting in short drum type rotary furnace gives:
 (a) 730 tons of lead bullion.
 (b) 105 tons of slag with a low lead content with 16.8 tons of zinc.
 (c) 110 tons of flue dust with 40 tons of lead and 49 tons of zinc.

III. Procedure according to the invention: Smelting of a sulfidic lead concentrate (galena) with 73.5% lead, 4.3% zinc.

(1) Agglomeration in the sinter machine with a charge of:
 (a) 1000 tons lead concentrate.
 (b) 32 tons of flue dust from the sinter machine.
 (c) 65 tons (dry weight) of lead mud separated from the flue gas of the short drum type rotary furnace processing.

This gives:
 (a) 950 tons of roast sinter with 82% lead, 4.8% zinc.
 (b) 32 tons of flue dust (recycled to the sinter apparatus).

(2) Smelting in the short drum type rotary furnace: Charge 950 tons roast sinter gives:
 (a) 740 tons of lead bullion.
 (b) 100 tons of slag with a low lead content.
 (c) 100 tons of flue dust with 43 tons of lead, 30 tons of zinc.

(3) Separation of dust and removal of zinc, by spraying gas containing the 100 tons of flue dust produced during the smelting of the charge with 4000 liters of 20% aqueous sulfuric acid in a Venturi washer gives:
 (a) 65 tons (dry weight) of lead mud (returned to the sinter apparatus).
 (b) 280–340 m.³ zinc sulfate solution with a zinc content of 27 tons—going to the recovery of zinc.

Examples I and II show that the recycling of the zinc content of the flue gases from the smelting apparatus results in a continuous increase in the zinc content, because the molten slag, the quantity of which is determined by the amount of gangue, can only take up small amounts of zinc. In the long run some 33 tons of zinc must be removed from the process for each thousand tons of concentrate. But this can be done only with substantial losses of lead, which can be avoided according to the invention.

While I have described herein some embodiments of my invention, I wish it to be understood that I do not intend to limit myself thereby except within the scope of the claims hereto or hereinafter appended.

I claim:

1. Method of extracting lead from sulfidic lead ores containing zinc which comprises simultaneously roasting and sintering the ore in an oxygen atmosphere, subsequently melting down this sintered product in a melting furnace whereby the sintered product is converted into metallic lead, a slag, volatile $SO_2$ and a flue dust containing zinc and lead, washing the flue dust with a solution of sulfurous acid which dissolves the zinc component of the flue dust but does not dissolve the lead component, and recycling the undissolved flue dust from which the zinc has been washed out into the sintering process.

2. A method as claimed in claim 1 in which the moisture content necessary for the roasting and sintering is regulated by adding the residue of undissolved flue dust to the initial material to be roasted.

3. A method as claimed in claim 1 in which the undissolved flue dust is dried before being returned to the sintering process.

References Cited in the file of this patent

UNITED STATES PATENTS

| | | |
|---|---|---|
| 715,024 | Clancy et al. | Dec. 2, 1902 |
| 2,797,158 | Wendeborn et al. | June 25, 1957 |

OTHER REFERENCES

Bray: Non-Ferrous Production Metallurgy, 2nd Ed., 1959, pages 282–303, John Wiley and Sons, New York.